United States Patent [19]
Reischl et al.

[11] 4,206,109
[45] Jun. 3, 1980

[54] PROCESS FOR THE PREPARATION OF STABLE DISPERSIONS

[75] Inventors: Artur Reischl; Hanns P. Müller; Kuno Wagner, all of Leverkusen, Fed. Rep. of Germany

[73] Assignee: Bayer Aktiengesellschaft, Leverkusen, Fed. Rep. of Germany

[21] Appl. No.: 829,363

[22] Filed: Aug. 31, 1977

[30] Foreign Application Priority Data

Sep. 1, 1976 [DE] Fed. Rep. of Germany ....... 2639254

[51] Int. Cl.$^2$ .......................... C08K 5/05; C08K 5/06; C08L 61/28
[52] U.S. Cl. .............................. 260/33.2 R; 252/308; 260/29.2 TN; 260/29.3; 260/29.4 R; 260/30.8 R; 260/31.4 R; 260/31.6; 260/31.8 M; 260/32.6 NA; 260/32.8 R; 260/33.4 UR; 260/33.4 R; 260/34.2; 525/1; 521/137; 521/163

[58] Field of Search .................. 260/29.4 R, 29.2 TN, 260/29.3, 2.5 BE, 2.5 F, 67.6 R, 70 R, 72 B, 33.4 UR, 33.4 R, 849, DIG. 45, 858, 33.2 R, 34.2; 252/308, 310, 311

[56] References Cited
FOREIGN PATENT DOCUMENTS
2324134 11/1974 Fed. Rep. of Germany .
2550796 5/1977 Fed. Rep. of Germany .

Primary Examiner—Theodore E. Pertilla
Attorney, Agent, or Firm—Gene Harsh; Joseph C. Gil; R. Brent Olson

[57] ABSTRACT

This invention relates to a process for the preparation of a finely divided, stable and relatively low viscosity dispersion of a polyisocyanate polyaddition product and an aminoplast and/or phenoplast and/or copolymer thereof in a hydroxyl containing compound and the use of such a dispersion as the starting component for the production of a polyurethane resin.

3 Claims, No Drawings

PROCESS FOR THE PREPARATION OF STABLE DISPERSIONS

BACKGROUND OF THE INVENTION

Diisocyanate polyaddition products dispersed in polyethers or polyesters are already known. According to German Auslegeschrift No. 1,168,075, diisocyanates are reacted with bifunctional primary alcohols in a polyether or polyester having a molecular weight of 500 to 3,000 as dispersing medium, the polyether or polyester containing at least two, exclusively secondary, hydroxyl groups in the molecule. According to German Auslegeschrift No. 1,260,142, polyaddition of compounds containing isocyanate groups and NH groups is carried out in situ in a polypropylene glycol ether used as dispersing medium. These processes give rise to dispersions of polyurethanes, polyureas or polyhydrozodicarbonamides in polyvalent higher molecular weight compounds which have hydroxyl groups. They are recommended as thickeners for textile or dye auxiliaries because of their viscosities, which are high even at low solid contents. A 10% (20%) polyhydrazodicarbonamide dispersion in a polypropylene glycol ether according to German Auslegeschrift No. 1,260,142, for example, has a viscosity of over 10,000 cP (2000,000 cP) at 25° C. This is more than 10 (200) times the viscosity of the pure dispersing agent. When attempts are made to prepare a 40% dispersion, the reaction mixture solidifies before polyaddition has been completed. The high viscosities obtained at even relatively low solids contents severely limit the possibilities of using the products of the process because, in many fields of application, it is not possible to dose these products with the aid of the usual dosing devices. Thus, for example, when producing polyurethane foams, for which such dispersions could be used according to German Offenlegungsschrift No. 2,423,984, the viscosities of the starting materials should be below 2500 cP if they are to be processed in the high pressure machines normally employed.

According to German Offenlegungsschriften Nos. 2,513,815; 2,550,833 and 2,550,862, substantially anhydrous, relatively low viscosity dispersions of polyureas and/or polyhydrazodicarbonamides in higher molecular weight and optionally also lower molecular weight compounds containing hydroxyl groups can be obtained by carrying out the polyaddition reaction continuously in continuous flow mixers. This process has the disadvantage of requiring a relatively complicated and expensive dosing and mixing technique. Moreover in some cases, when the solid concentrations are relatively high, removal of the heat of reaction may be difficult.

According to the two earlier proposals by the present applicants in German Offenlegungsschriften Nos. 2,550,796 and 2,550,797 stable dispersions of polyisocyanate polyaddition products in hydroxyl containing compounds as dispersing agents are obtained by in situ reaction of polyisocyanates with aminofunctional compounds in dispersing agents, if the reaction is carried out in the presence of water. The starting components used for this reaction may contain ionic groups. It was surprisingly found that stable dispersions having the required low viscosity could be produced even in simple stirrer apparatus, particularly if the reaction mixture contained about 7 to 35% by weight of water, based on the total quantity of reaction mixture including water. This is particularly surprising in view of the fact that a water content of, for example, 10, 15 or 20% by weight is known to increase the viscosity of a polyalkyleneether glycol at 25° C. to 4,8 or over 50 times the original viscosity. If the water content is increased even further, the solution or emulsion initially obtained in many cases separates out into its different phases. Both the high increase in viscosity and the phase separation would inevitably lead a routineer in the art to expect that the addition of water would be unsuitable for the industrial production of low viscosity polyisocyanate polyaddition products in hydroxyl containing compounds, particularly since water would be an additional reactant which could interfere with the isocyanate polyaddition reaction.

During further development of the process according to the above mentioned German Ofenlengungsschrift, it has now been found that the physical properties of polyurethane resins produced from the dispersions could be further improved or modified if reaction of substances capable of forming aminoplast and/or phenoplast condensates is carried out either side by side with the polyisocyanate polyaddition reaction or subsequently in the hydroxyl containing dispersing agent. The process according to German Offenlegungsschriften Nos. 2,550,796 and 2,550,797 is preferably employed, that is to say the polyisocyanate polyaddition reaction is carried out in the presence of more than 4% by weight, preferably 7 to 35% by weight, most preferably 10 to 25% of water, based on the quantity of reaction mixture including water.

A process for the preparation of dispersions of aminoplast condensates in organic polyhydroxyl compounds has already been disclosed in German Offenlegungsschrift No. 2,324,134. In this process, the known method of preparation of aminoplast condensates by oligocondensation or polycondensation of compounds capable of aminoplast formation is carried out in situ in the organic polyhydroxyl compounds used as reaction medium. According to a further development of this process described in an earlier proposal by the present Applicants in German Offenlegungsschrift No. 2,512,385, the resulting dispersions of polycondensates in hydroxyl containing compounds are after-treated at temperatures of between −5° C. and 180° C. with aliphatic or cycloaliphatic monoamines or polyamines which have at least one primary or secondary amino group and are gaseous or liquid at room temperature or with alkyl hydrazines which have at least one primary or secondary amino group and are gaseous or liquid at room temperature.

DESCRIPTION OF THE INVENTION

It has now surprisingly been found that the particle size of the dispersed polycondensation products is smaller by about 1 to 2 powers of ten if, in accordance with this invention, the polycondensation reaction is carried out in the presence of the polyisocyanate polyaddition product or simultaneously with the polyisocyanate polyaddition reaction. Under these conditions, very finely divided, low viscosity and stable dispersions can be obtained even from those starting compounds which cannot give rise to sufficiently stable dispersions by the processes described in German Offenlegungsschriften Nos. 2,324,134 and 2,512,385. One major advantage of the process according to the invention compared with the prior art discussed above in the field of stable dispersions of polyisocyanate polyaddition products in polyhydroxyl compounds lies in the substantially increased range of starting materials which may be used. By the process of the invention, it is possible to prepare dispersions which are not only less expensive than the known products but also give rise to polyurethane resins which have improved or modified properties.

That variation of the process according to the invention in which the polyaddition reaction and the polycondensation reaction are carried out simultaneously is particularly economical. It permits a wider variation in the properties of the dispersions to be obtained because intermediate products of the polycondensation reaction are built into the polyaddition product and conversely segments of polyadducts which have urea end groups are built into the polycondensate.

The present invention thus relates to a process for the in situ preparation of a stable dispersion of a polyaddition and polycondensation product which may contain ionic groups in a hydroxyl containing compound as dispersing agent comprising reacting (a) an organic polyisocyanate with (b) a compound having primary and/or secondary amino groups and/or primary hydroxyl groups in (c) a compound having at least one hydroxyl group, compounds (c) containing secondary hydroxyl groups if compounds (b) have primary hydroxyl groups, the reaction being optionally carried out in the presence of more than 4% by weight of water, based on the quantity of reaction mixture including water, and optionally followed by removal of the water in known manner, characterized in that polycondensation of substances capable of aminoplast and/or phenoplast formation is carried out simultaneously with the polyisocyanate polyaddition reaction in the hydroxyl containing dispersing agent (c).

The invention also relates to a process for the preparation of a stable dispersion of a polyaddition and polycondensation product optionally containing ionic groups in a hydroxyl containing compound as dispersing agent by in situ polycondensation of a substance capable of aminoplast and/or phenoplast formation, characterized in that the polycondensation reaction is carried out in a dispersing agent consisting of a compound having at least one hydroxyl group, which dispersing agent contains from 1 to 50% by weight, preferably 3 to 30% by weight and most preferably 5 to 20% by weight of reaction products of (a) organic polyisocyanates with (b) higher molecular weight and/or low molecular weight compounds having primary and/or secondary amino groups and/or hydroxyl groups, the said reaction products of (a) and (b) being dispersed in the said dispersing agent.

The finding that stable dispersions can be prepared by the process according to the invention must be regarded as surprising for the following reasons: First, the stable dispersions known per se of polyisocyanate polyaddition products would be expected to coagulate as a result of cross-linking reactions in the event of a polycondensation reaction being carried out in these dispersions with the aid of formaldehyde. Secondly, in that variation of the present process in which the polyaddition reaction and polycondensation reaction are carried out simultaneously, one would not expect reproducible products. In particular, one would not expect finely divided, stable dispersions to be formed in view of the possible reactions of the amino-functional compounds with formaldehyde.

The dispersing agents used according to the present invention, that is to say the substances forming the external, continuous phase, are alcohols containing from 1 to 8, preferably 2 to 6 and most preferably 2 to 4 primary and/or secondary hydroxyl groups and having a molecular weight of from 62 to 16,000, preferably 62 to 12,000 and most preferably 106 to 8,000.

These alcohols include e.g. low molecular weight alcohols or glycols having a molecular weight of between 62 and about 400 which may also contain ether, thioether or ester bonds. They also include polyesters, polyethers, polythioethers, polyacetals, polycarbonates and polyester amides having molecular weights above 400, such as those known per se for the production of polyurethanes. Suitable low molecular weight dispersing agents apart from monoalcohols such as butanol, 2-ethylhexanol, amyl alcohol and ethylene glycol monoethylether also include the diols and triols conventionally used in polyurethane chemistry as chain lengthening agents or cross-linking agents, e.g. propylene glycol-(1,2) and -(1,3); butylene glycol-(1,4) and -(2,3); hexanedoil-(1,6); octanedoil-(1,8); neopentyl glycol; cyclohexane dimethanol (1,4-bis-hydroxy-methylcyclohexane); 2-methyl-1,3-propanediol; glycerol; trimethylol propane; hexanetriol-(1,2,6); butanetriol-(1,2,4) or trimethylolethane, in particular glycols which have a hydrophilic character such as ethylene glycol, diethylene glycol, triethylene glycol, tetraethyleneglycol and polyethylene glycols having a molecular weight of up to 400. The dispersing agents also include compounds such as dipropylene glycol, polypropylene glycols with a molecular weight of up to 400, dibutylene glycol, polybutylene glycols with a molecular weight of up to 400, thiodiglycol, castor oil ester diols of the general formulae

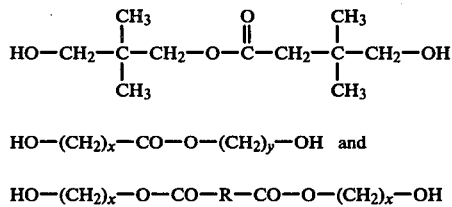

HO—(CH$_2$)$_x$—CO—O—(CH$_2$)$_y$—OH and

HO—(CH$_2$)$_x$—O—CO—R—CO—O—(CH$_2$)$_x$—OH in which
R represents an alkylene or arylene group having from 1 to 10, preferably 2 to 6 carbon atoms,
x=2 to 6 and
y=3 to 5, e.g. δ-hydroxybutyl-ε-hydroxycaproic acid ester, ω-hydroxy-hexyl-γ-hydroxybutyric acid ester, adipic acid-bis-(βhydroxyethyl)ester and terephthalic acid-bis-(β-hydroxyethyl)-ester; also diolurethanes of the general formula

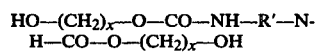

in which
R' represents an alkylene, cycloalkylene or arylene group having from 2 to 15, preferably 2 to 6 carbon atoms and
x represents a number of between 2 and 6, e.g. 1,6-hexamethylene-bis-(β-hydroxyethylurethane) or 4,4'-diphenylmethane-bis-(δ-hydroxybutylurethane); also diolureas of the general formula

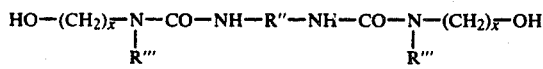

in which R" represents an alkylene, cycloalkylene or arylene group having from 2 to 15, preferably 2 to 9 carbon atoms, R''' represents hydrogen or a methyl group and
x=2 or 3, e.g. 4,4'-diphenylmethane-bis-(β-hydroxyethylurea) or the compound

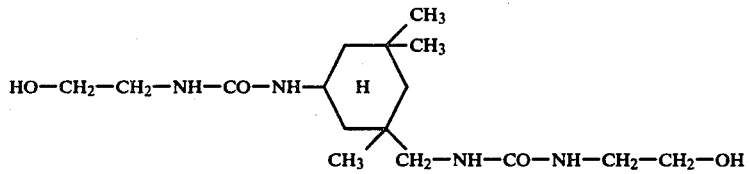

Particularly suitable among the divalent and trivalent low molecular weight alcohols are those which, either alone or as mixtures or with the addition of higher molecular weight alcohols, are liquid at temperatures below 50° C.

The hydroxyl containing higher molecular weight polyesters which may be used as dispersing agents include, for example, reaction products of polyvalent, preferably divalent alcohols, to which trivalent alcohols may be added, with polybasic, preferably dibasic carboxylic acids. Instead of using free polycarboxylic acids, the corresponding carboxylic acid anyhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. with halogen atoms, and/or unsaturated. The following are mentioned as examples; Succinic acid, adipic acid; suberic acid; azelaic acid; sebacic acid; phthalic acid; isophthalic acid; trimellitic acid; phthalic acid anhydride; tetrahydrophthalic acid anhydride, hexahydrophthalic acid anhydride; tetrachlorophthalic acid anhydride; endomethylene tetrahydrophthalic acid anhydride; glutaric acid anhydride; meleic acid; maleic acid anhydride; fumaric acid; dimeric and trimeric fatty acids such as oleic acid, which may be mixed with monomeric fatty acids dimethyl terephthalate and terephthalic acid-bis-glycol esters. Examples of suitable polyhydric alcohols include ethylene glycol; propylene glycol-(1,2) and -(1,3); butylene glycol-(1,4) and -(2,3); hexanediol-(1,6); octanediol-(1,8); neopentyl glycol; cyclohexanedimethanol (1,4-bis-hydroxymethylcyclohexane); 2-methyl-1,3-propanediol; glycerol, trimethylolpropane; hexanetriol-(1,2,6); butanetriol-(1,2,4); trimethylolethane; triethylene glycol tetraethyleneglycol; polyethyleneglycols; dipropylene glycol, polypropylene glycols, dibutylene glycol and polybutylene glycols. The polyesters may also contain a proportion of carboxyl end groups. Polyesters of lactones such as ε-caprolactam or hydroxycarboxylic acids such as ω-hydroxycaprioc acid may also be used.

The higher molecular weight polyethers preferably used as dispersing agents are prepared in known manner by the reaction of starter compounds which have reactive hydrogen atoms with alkylene oxides such as ethylene oxide, propylene oxide, butylene oxide, styrene oxide, tetrahydrofuran or epichlorohydrin or with any mixtures of these alkylene oxides. It is in many cases preferred to use polyethers which contain predominantly primary hydroxyl groups.

Suitable starter compounds containing reactive hydrogen atoms include, for example, water; methanol; ethanol; ethylene glycol; propylene glycol-(1,2) or -(1,3); butylene glycol-(1,4) or -(2,3); hexanediol-(1,6); octanedoil-(1,8); neopentyl glycol; 1,4-bis-hydroxymethylcyclohexane; 2-methyl-1,3-propanediol; glycerol; trimethylolpropane; hexanetriol-(1,2,6); butanetriol-(1,2,4); trimethylolethane; pentaerythritol; mannitol; sorbitol; methyl glycoside; sucrose; phenol; isononylphenol; resorcinol; hydroquinone; 1,2,2- and 1,1,3-tris-(hydroxyphenyl)-ethane; ammonia; methylamine; ethylenediamine; tetra- or hexamethylenediamine; diethylene triamine; ethanolamine; diethanolamine; triethanolamine; aniline; phenylenediamine; 2,4- and 2,6-diaminotoluene and polyphenyl-polymethylene polyamines which can be obtained by aniline-formaldehyde condensation. Resinous materials such as phenol and resol resins may also be used as starter compounds.

Polyethers modified with vinyl polymers such as the compounds obtained by the polymerization of styrene and acrylonitrile in the presence of polyethers (U.S. Pat. Nos. 3,383,351; 3,304,273; 3,523,093 and 3,110,695 and German Patent 1,152,536) and polybutadienes which contain hydroxyl groups are also suitable.

Particularly to be mentioned among the polythioethers are the condensation products obtained by reacting thiodiglycol on its own and/or with other glycols, dicarboxylic acids, formaldehyde, amino carboxylic acids or amino alcohols. The products obtained are polythio mixed ethers, polythioether esters or polythioether ester amides, depending on the cocomponents.

Suitable polyacetals include, for example, the compounds which can be prepared from glycols such as diethylene glycol, triethylene glycol, 4,4'-dioxethoxydiphenyl dimethylmethane, hexanediol and formaldehyde. Polyacetals suitable for the purpose of the invention can also be obtained by the polymerization of cyclic acetals.

Suitable hydroxyl polycarbonates are known per se, for example, the compounds obtained by the reaction of diols such as propanediol-(1,3), butanediol-(1,4) and/or hexanediol-(1,6), diethyleneglycol, triethyleneglycol or tetraethyleneglycol with diarylcarbonates such as diphenyl carbonate or phosgene.

Suitable polyester amides and polyamides include e.g. the predominantly linear condensates obtained from polyvalent saturated and unsaturated carboxylic acids or their anhydrides and polyvalent saturated and unsaturated amino alcohols, diamines, polyamines and mixtures thereof.

Mixtures of the above mentioned high molecular weight and low molecular weight dispersing agents may, of course, also be used according to the invention, as already mentioned above.

The dispersing agents used according to the invention are preferably free from unstable groups, for example, ester groups which could be destroyed by hydrolysis or aminolysis during the process.

Compounds of this kind should be added to the completely prepared, highly concentrated dispersion only after completion of the polyaddition reaction.

The hydroxyl compounds or mixtures thereof used as dispersing agents according to the invention should be so chosen that, as mixtures with the water, (optionally hydroxyl compounds or preferably NH compounds and optionally an inert solvent added according to the invention) they are liquid at the reaction temperature, i.e. in the form of solutions or emulsions. Their viscosity at the reaction temperature should generally be below 20,000 cP and preferably below 5,000 cP so that the usual stirrer and mixing apparatus can be employed.

If inert solvents are used, they are preferably of the kind which can be distilled off as azeotropic mixtures with water, for example, benzene or toluene.

With regard to the starting components used for the polyisocyanate polyaddition reaction, reference should be made to the material disclosed in German Offenlegungsschriften Nos. 2,550,796 and 2,550,797 and U.S. Ser. Nos. 740,451 and 740,452, 740,454 and 740,450 (all filed Nov. 10, 1976), the disclosures of these six documents being herein incorporated by reference. All the compounds mentioned in these documents, including monofunctional or polyfunctional isocyanate, amines, hydrazines, hydrazides and polyether based emulsifying agents, which compounds may contain ionic groups, are also suitable for the process according to the invention. The compounds capable of aminoplast and/or phenoplast formation used according to the invention may be any of those described in German Offenlegungsschrift Nos. 2,324,134 and U.S. Ser No. 464,099 filed Apr. 25, 1974, the disclosures of these two documents being herein incorporated by reference. These include carbonyl compounds, in particular formaldehyde, and nitrogen compounds such as polycarboxylic acid polyamides, urethanes and polyurethanes, ureas, thioureas, biurets, amidines, guanidines, melamines, arylamines, ammonia (in particular in combination with quinones such as benzoquinone as carbonyl compound), hydrazine and hydrazides as well as phenols, phenol derivatives such as bisphenol, cresols of phenol or bisphenol and formaldehyde, condensation products of phenol and cyclohexanone, phenol sulphonic acid and naphthalene sulphonic acids. In addition to the compounds mentioned in German Offenlegungsschrift No. 2,324,134, the following compounds which have ionic groups may be used as starting compounds for aminoplast or phenoplast formation:

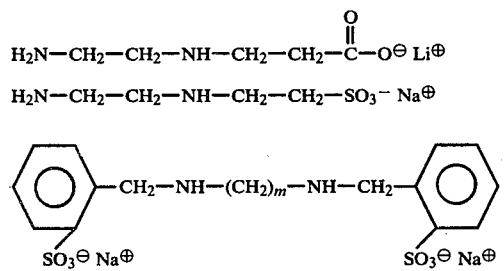

-continued
(m = integer of 2 to 6, preferably 2 or 6)

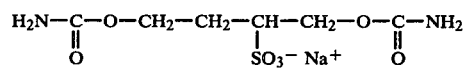

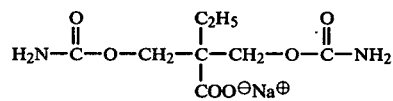

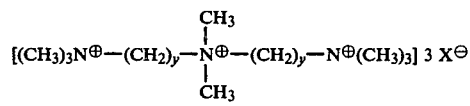

(y = 2 or 3; X = any anion)

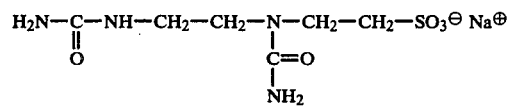

The process according to the invention may be carried out either continuously or discontinuously. If polyaddition and polycondensation are carried out one after the other, the polyisocyanate polyaddition reaction is preferably carried out by the method described in German Offenlegungsschriften Nos. 2,550,796 and 2,550,797, as already mentioned above. Polycondensation of the compounds capable of aminoplast or phenoplast formation is subsequently carried out by the method described in German Offenlegungsschrift No. 2,324,134 in the dispersion of polyisocyanate polyaddition products in the hydroxyl containing compound, which dispersion was prepared in the first stage of the process according to the invention. The products of the process may subsequently be treated with gaseous or liquid aliphatic or cycloaliphatic compounds having at least one primary or secondary amino group by the method described in German Offenlegungsschrift No. 2,512,385 and U.S. Ser. No. 664,324 (filed Mar. 5, 1976), these disclosures being herein incorporated by reference, to remove residues of unwanted free formaldehyde.

It is possible according to the invention but less desirable for economic reasons to carry out the polycondensation reaction in dispersions which have been prepared according to German Offenlegungsschrift No. 2,550,860 and U.S. Ser. No. 740,465, (filed Nov. 10, 1976), the disclosures being herein incorporated by reference. These dispersions are obtained by mixing previously prepared aqueous dispersions of polyisocyanate polyaddition products with hydroxyl compounds and, if desired, subsequently removing the water. The starting components which may be used in this variation of the process according to the invention may be found in the description given in German Offenlegungsschrift No. 2,550,860.

The stability in storage, particle size and particle size distribution of the condensation products dispersed in polyhydroxyl compounds according to the invention and the final viscosities of the dispersions, which are related to these factors, are influenced by the nature and quantity of the catalyst used, the hydrogen ion and salt ion concentration, the quantity of water used and the temperatures employed. All these parameters do, of course, also affect the polyisocyanate polyaddition reaction. As already mentioned above, intermediate products of aminoplast condensation may be built into the polyurethanes formed in the process and conversely. In spite of all these possible complications, the process according to the invention is surprisingly simple to carry out both as a one-stage process and as a two-stage process (continuously or discontinuously) and can be optimized quite rapidly by the routineer in the art.

It is advantageous for the progress of the condensation reaction if formaldehyde and the amino-functional compounds are not added separately to the reaction mixture but in the form of a so-called reactive solution prepared by mixing these components immediately before they are added. By the time these reactive solutions are added to the reaction mixture in which the polyisocyanate polyaddition reaction takes place at the same time, any condensation taking place in these reactive solutions should not have progressed beyond the stage where the viscosity at 25° C. is below 10,000 cP and preferably below 3,000 cP. In order to prevent the formation of agglomerates during the polycondensation reaction, it has been found particularly advantageous to use amino compounds which have ionic groups, and preferably bifunctional amino compounds of this kind (optionally only a proportion of ionic amine compounds in addition to non-ionic amino compounds). The same advantageous effect is obtained by using ionic polyurethane dispersions in the reaction mixture.

The one-shot process (simultaneous polycondensation and polyaddition) is preferred according to the invention, not only because of reduced production costs but also because it is surprisingly found that when the process is carried out in a single stage, the quality of the reaction products is little affected by fluctuations in the reaction conditions so that the quality of the products obtained from production on a large commercial scale can be guaranteed to be reproducible within narrow tolerances. Furthermore, the mutual incorporation of aminoplast intermediate products into the polyaddition products and of polyurethane intermediate products into the polycondensates has a positive synergistic influence on the quality of the polyurethane products obtained from the dispersions according to the invention. These polyurethane resins have substantially improved mechanical properties, greater resistance to weathering and improved fire resistance.

In another preferred variation of the process according to the invention, the polycondensation reaction and/or polyaddition reaction are carried out continuously in a static apparatus in which the starting components are vigorously mixed so that the reactions proceed very rapidly. Unreacted starting materials or volatile components are subsequently removed from the reaction chamber by evaporation. The heat required for evaporation is obtained from the heat of the polyaddition or polycondensation reaction.

A suitable apparatus for this variation of the process is the so-called multiphase flow tube which consists of a helical tube which is surrounded by a heating jacket and to which an expansion nozzle is attached at one end and a separating vessel at the other. The liquid in which the reactants are dissolved or dispersed is heated under pressure and expanded in the expansion nozzle. An annular flow develops in the spiral reaction tube behind it and the liquid flows in a continuous layer along the wall of the tube while the steam flows as a turbulent stream along the center of the tube. The liquid is vigorously mixed, due to the unstable flow (wave movement), the uneven thickness of the layer over the circumference of the tube and the secondary stream produced by centrifugal forces. Volatile reaction products, e.g. water, are removed from the liquid by evaporation into the vapor space. Heat is removed or supplied through the wall of the tube. The advantage of this method is that owing to the small paths required for transport, the vigorous mixing of the components within the layer of liquid, and the removal of components no longer being required by evaporation into the vapor space, the reaction reaches a very high velocity which is maintained throughout the reaction chamber. This results in short residence times. Efficient heat exchange between the wall and the liquid is ensured by the flow of the liquid and the wetting of the wall. Owing to the thin liquid layers, the heat can be rapidly brought to the site of the reaction or removed from it. Multiphase flow tubes suitable for the purpose of the invention have been described, for example, in German Offenlegungsschriften Nos. 1,667,051 and 1,921,045 and U.S. Pat. Nos. 3,550,669 and 3,834,441, the disclosures of which are herein incorporated by reference.

The total solids content of the dispersions prepared according to the invention is generally between 2 and 60% by weight, preferably between 10 and 40% by weight. The ratio of polycondensate to polyadduct in terms of the solids contents is approximately between 1:10 and 10:1, preferably between 3:7 and 7:3. If, however, polyaddition and polycondensation are carried out simultaneously, the formaldehyde condensation product and polyisocyanate polyaddition product can no longer be exactly distinguished from each other, as already explained above.

The dispersions prepared by the process according to the invention may be reacted in known manner as "modified" low molecular weight or higher molecular weight polyhydroxyl compounds with polyisocyanates of the kind mentioned above, optionally together with unmodified polyhydroxyl compounds or polyamines, hydrazines or hydrazides of the kind mentioned above as chain lengthening agents and optionally with blowing agents, catalysts and other additives to produce polyurethane resins which have improved mechanical properties. Foam resins, elastomers, homogeneous and porous coatings and films, lacquers and thermoplastic polyurethanes are examples of the products which can be produced from these dispersions. The products of the process may also be used as such or after reaction with a polyisocyanate excess to form "modified" prepolymers, for the production of aqueous polyurethane dispersions by known methods.

The production of polyurethane resins from the polycondensate/polyadduct dispersions obtainable according to the invention is also an object of this invention.

Another factor which is also particularly important in determining the improvement in properties which the products according to the invention give rise to in the polyurethane resins produced from them (above all improved compression resistance) is the particle size of the dispersed polyaddition products. Thus, for example, when polyether dispersions are used as starting material for the production of polyurethane foams, the diameter of the particles of filler must be much smaller than the dimensions of the cell walls (20 to 50 $\mu$m). In polyurethane coatings, the particles must also be so small that uniform coatings with a smooth surface are obtained even if the polyurethanes are applied as very thin layers.

It is advantageous that the process according to the invention gives rise to dispersions in which the particle size ranges from 0.01 to 5 μm, preferably 0.1 to 1 μm, which corresponds well to the commercial requirements.

The following Examples serve to explain the process according to the invention. The figures given represent parts by weight or percentages by weight unless otherwise indicated.

EXAMPLES

Example 1

(a) Preparation of a 39.1% dispersion of APHS/PHD (anionic polyurea/polyhydrazodicarbonamide) in a trifunctional polyether. Index (NCO/OH)=100; anion equivalent content=0.03/100 g of solid content.

Formulation 60.9 Parts by weight of a polyether of propylene oxide and ethylene oxide (hydroxyl number 34; 80% primary hydroxyl groups; hereinafter referred to as "Polyether I") started on trimethylolpropane;

31.5 parts by weight of tolylene diisocyanate (2,4- : 2,6-isomers=4:1; hereinafter referred to as "Diisocyanate T 80");

2.1 parts by weight of the diaminosulphonate of the formula

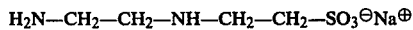

$$H_2N-CH_2-CH_2-NH-CH_2-CH_2-SO_3^\ominus Na^\oplus$$

(hereinafter referred to as "AAS salt");

5.5 parts by weight of hydrazine (as 99% hydrate);

23.8% by weight of water, based on the reaction mixture including water (51.5%, based on the dispersing agent; 80%, based on the solid content; 31.3% based on the anhydrous dispersion).

Conditions of Preparation

The reaction vessel used is a stirrer apparatus equipped with reflux condenser and an inlet tube with non-return valve in the lower third of the reaction vessel. The dispersing agent heated to 80° C. is mixed with the dilute aqueous solution of the hydrazine hydrate and AAS salt. Starting at this temperature, the diisocyanate is then pumped in so rapidly, with stirring, that polyaddition is accompanied by vigorous boiling under reflux. Distillation of water at reduced pressure is begun after 10 minutes. The temperature is raised to 110° C. towards the end and the practically anhydrous dispersion is passed through a 100 μm sieve. The very finely divided, stable, 39.1% dispersion obtained has a viscosity of 11,500 cP/25° C. When diluted to 20% by weight and 10% by weight with Polyether I, the dispersion has a viscosity of 2100 cP/25° C. and 1310 cP/25° C., respectively.

(b) Process according to the invention:
Preparation of a 40% APHS-PHD/aminoplast dispersion.
Ratio of solid contents: 1:1.

Formulation 4448 parts by weight of the 39.1% APHS-PHD dispersion in Polyether I described above;

2600 parts by weight of a linear polypropylene glycol with secondary hydroxyl groups (hydroxyl number 56; hereinafter referred to as "PolyetherII");

600 parts by weight of urea;

839 parts by weight of melamine;

1622 parts by weight of a 37% aqueous formaldehyde solution;

33 parts by weight of 85% phosphoric acid;

17 parts by weight of normal sodium hydroxide solution.

Reaction Conditions

The finely divided, anionic 39.1% dispersion is diluted with Polyether II and heated to 95° C. with stirring. Phosphoric acid and sodium hydroxide solution are added. A freshly prepared mixture of urea, melamine and formaldehyde solution cooled to room temperature is then slowly introduced at reduced pressure. The vacuum employed is chosen to ensure continuous distillation of water from the reaction mixture during addition of the mixture of urea, melamine and formaldehyde. Stirring is continued for one hour at 100° to 100° C. after removal of the water.

The finely divided 40% dispersion obtained has a viscosity of 4030 cP/25° C.

Example 2

(a) Preparation of a reactive solution of urea, melamine and formaldehyde.

Formulation 37.5 Parts by weight of urea, dissolved in
50.6 Parts by weight of 37% aqueous formaldehyde;
39.4 Parts by weight of melamine;
76.0 Parts by weight of 37% aqueous formaldehyde solution;
0.6 Parts by weight of normal sodium hydroxide solution;
20.0 Parts by weight of Polyether I;
1.1 Part by weight of 85% phosphoric acid.

Conditions of Preparation

Melamine, the remainder of the formalin solution and the sodium hydroxide solution are stirred into the aqueous urea formaldehyde solution at room temperature. The mixture is then heated to 80° C. The polyether is added when the malamine has completely dissolved. The reaction solution is then cooled to 20° C. and adjusted to pH 5 with phosphoric acid.

(b) Preparation of a 9.55% PHS (=polyurea) dispersion in Polyether II.

Formulation 504.0 Parts by weight of Polyether II;
4.5 Parts by weight of 1,4-butane diol reacted with
62.5 Parts by weight of 4,4'-diphenylmethane diisocyanate:
39.6 Parts by weight of 4,4'-diaminodiphenylmethane dissolved in
50.4 Parts by weight of Polyether II.

Reaction Conditions

A prepolymer of butanediol and 4,4'-diphenylmethane diisocyanate is first prepared at 100° C. This is then mixed with the polyether at room temperature and the mixture is added dropwise with vigorous stirring into a solution of the diamine in the remaining Polyether II heated to 60° C.

The finely divided dispersion obtained has a viscosity of 820 cP/25° C.

(c) Process according to the invention:
Preparation of a PHS/aminoplast dispersion in a linear polyether; ratio of solid content: 4:6.

Formulation 667.0 Parts by weight of the 10% PHS dispersion described under (b);

1.0 Part by weight of 85% phosphoric acid;

225.2 Parts by weight of the reactive solution of urea, melamine and formaldehyde described under (a).

Reaction Conditions

Phosphoric acid is added to the PHS dispersion in Polyether II and the dispersion is heated to 45°–50° C. in a stirrer apparatus. The reactive solution of urea, melamine and formaldehyde is then added dropwise over a period of 30 minutes at a vacuum of 30 Torr. The water is removed by distillation at the same time. The temperature is raised to 110° C./15 Torr towards the end of distillation. The mixture is then stirred for a further 30 minutes before it is neutralized with ammonia at room temperature. A thin, stable dispersion having a viscosity of 750 cP/25° C. is obtained.

Example 3

(a) Preparation of a hydroxyl functional 38.3% dispersion of PHS/PHD in a linear polyether.

Index 1 (NCO/NH).100=100

Index 2 (NCO/NH=OH).100=91.

Formulation 61.7 Parts by weight of Polyether II;

31.0 Parts by weight of diisocyanate T 80;

5.2 Parts by weight of hydrazine (added as 99% hydrazine hydrate diluted with water);

2.1 Parts by weight of ethanolamine;

a total of 22.3% by weight of water, based on the quantity of reaction mixture including water (46.5%, based on dispersing agent; 75.1%, based on solid content; 28.7%, based on the anhydrous dispersion).

The method is analogous to that of Example 1 (a).

The resulting stable dispersion which has a residual water content of 0.2% by weight has a viscosity at 25° C. of 2460 cP at a concentration of 38.3% and a viscosity at 25° C. of 680 cP and 510 cP, respectively, when diluted to 20% and 10% with Polyether II.

(b) Process according to the invention:

Preparation of a 20% PHS/PHD/aminoplast dispersion; ratio of solid content: 44:56.

The general method of procedure is the same as in Example 2 (c) but instead of the PHS dispersion used in that example, the above described 10% dispersion in Polyether II of a mixture of PHD/PHS containing hydroxyethyl end groups is used.

The stable, anhydrous dispersion obtained as end product has a viscosity of 565 cP/25° C.

Example 4

(a) Preparation of a 20% PHD dispersion in Polyether I; index (NCO/NH).100=100

Formulation 80 parts by weight of Polyether I;

16.9 parts by weight of diisocyanate T 80;

3.1 parts by weight of hydrazine (added as 99% hydrate diluted with water);

11.3% by weight of water based on the quantity of reaction mixture including water (16.0%, based on dispersing agent; 64%, based on solid content; 12.8%, based on anhydrous dispersion).

Conditions of Preparation

The dispersing agent preheated to 70° C. and hydrazine hydrate diluted with water are mixed in a stirrer apparatus equipped with reflux condenser, and the mixture is heated to 80° C. with stirring. The diisocyanate mixture is then rapidly introduced into the stirrer cone. Polyaddition sets in immediately with vigorous boiling of the water under reflux. After addition of the diisocyanate, the temperature is lowered to between 60 and 80° C. over a period of 20 to 30 minutes (if necessary with cooling), and the water is distilled off at reduced pressure. Towards the end, the temperature is allowed to rise to 90°–120° C. until no more water distils over. The reaction mixture is then filtered through a 100 μm sieve.

The anhydrous, finely divided, stable 20% (10%) dispersion has a viscosity at 25° C. of 2315 cP (1350 cP).

(b) Process according to the invention:

Preparation of a 20% PHD/aminoplast dispersion; ratio of solid content 44:56.

The method is analogous to that used in Example 2 (c) but instead of the PHS dispersion used there, the above described PHD dispersion diluted to 10% with Polyether I is used.

The anhydrous, finely divided dispersion has a viscosity of 2260 cP at 25° C.

Example 5

(a) Discontinuous preparation of a 20% APHS dispersion in Polyether II.

Formulation 5424 parts by weight of Polyether II;

1020 parts by weight of 46.5% aqueous AAS salt solution;

170 parts by weight of 25% aqueous ammonia solution;

625 parts by weight of 4,4'-diphenylmethane diisocyanate;

217.5 parts by weight of tolylene-2,4-diisocyanate.

Reaction Conditions

The polyether and AAS salt solution are introduced into a stirrer apparatus equipped with distillation attachment. A mixture of the tolylene diisocyanate with one third of the diphenylmethane diisocyanate is introduced at 60° to 70° C. at such a rate that the reaction temperature remains below 95° C. The contents of the vessel are then cooled to 30°–40° C., the aqueous ammonia solution is added and finally the remainder of the diphenyl methane diisocyanate which has been heated to 60°–80° C. 15 minutes after all the isocyanate has been added, the water is distilled off at reduced pressure, the temperature being raised to 90°–110° C. towards the end.

The anhydrous APHS dispersion obtained has a viscosity of 880 cP at 25° C.

(b) Process according to the invention:

Continuous preparation of an APHS/aminoplast dispersion ratio of solid contents 1:1

Formulation

Storage Vessel B 1 contains a mixture of 1810 parts by weight of the 20% anionic polyurea dispersion described under (a);

5125 parts by weight of Polyether II;

16 parts by weight of 85% phosphoric acid and 9 parts by weight of normal sodium hydroxide solution.

Storage Vessel B 2 contains 700 parts by weight of a 50% aqueous urea solution.

Storage Vessel B 3 contains 500 parts by weight of a 37% aqueous formaldehyde solution.

TABLE I

| Storage Vessel | Rate of Addition (Parts by weight per minute) | Temperature (°C.) |
|---|---|---|
| B 1 | 69.35 | T 1 = 105–110 |
| B 2 | 6.00 | T 2 = 20–30 |
| B 3 | 5.56 | T 3 = 20–30 |

Conditions of Preparation

The dilute dispersion from B 1 and the urea solution from B 2 are delivered into a static mixer M 1 (manufactured by Kenics) (diameter ¼"; 21 elements; volume approximately 3 ml) by means of triple piston pumps and vigorously mixed therein. The resulting mixture is then combined with formaldehyde solution in a second static mixer M 2. The reaction mixture is then delivered at a pressure of 2 to 5 bar into a helical reaction flow tube having an internal diameter of 9 mm and a length of 6 m. This tube is inside a silicone bath which is kept at a temperature of 135 to 145° C. The tube ends in a separating vessel kept at 90 at 100° C., to which a vacuum of 10 to 20 Torr is applied. When the reaction product is injected into the separating vessel, the water originally present in the solutions and produced as water of reaction in the process of formaldehyde condensation evaporates and is condensed by means of a condenser. The separating vessel is connected to a distillation bridge and via a pump to another vessel for the discharge of product.

The total time of stay of the reactants (from M 1 to discharge of product) is about 10 minutes. The residence time in the reaction tube, in which most of the volume is occupied by steam, is less than 1 minute.

The finely divided 10% polymethylene urea dispersion obtained has a viscosity of 540 cP at 25° C.

Example 6

Continuous preparation of a 10% polyhydrazodicarbonamide/polymethyleneurea dispersion in a branched polyether by simultaneous polyaddition and polycondensation.

Ratio of PHD:polymethyleneurea = 1:1.

Formulation

Storage Vessel B 1 contains a mixture of 6770 parts by weight of dispersing agent consisting of a polyether of propylene oxide and ethylene oxide which has been started on trimethylolpropane (hydroxyl number of polyether 31; 70% primary hydroxyl groups; hereinafter referred to as "Polyether III");

90 parts by weight of hydrazine monohydrate (99%);
600 parts by weight of a 50% aqueous urea solution;
20 parts by weight of 85% phosphoric acid and
11 parts by weight of normal sodium hydroxide solution.

Storage Vessel B 2 contains 310 parts by weight of diisocyanate T 80.

Storage Vessel B 3 contains 450 parts by weight of a 37% aqueous formaldehyde solution.

TABLE II

| Storage Vessel | Rate of Addition (Parts by weight per minute) | Temperature (°C.) |
|---|---|---|
| B 1 | 75.54 | T 1 = 90–100 |
| B 2 | 3.08 | T 2 = 20 |
| B 3 | 4.46 | T 3 = 20 |

Reaction Conditions

The method is basically similar to that of Example 5 but the diisocyanate polyaddition reaction begins in mixer M 1 and immediately thereafter the formaldehyde solution is introduced coaxially into M 2 at the center of the reaction mixture flowing through this vessel. The initial pressure in the reaction flow tube is 2 to 3 bar, the temperature of the silicone bath 120 to 130° C. and the temperature of the separating vessel 90 to 110° C. A vacuum of 10 to 12 Torr is applied to the separating vessel.

The anhydrous, stable 10% dispersion has a viscosity of 1040 cP at 25° C.

Example 7

Discontinuous preparation of a 20% PHD/aminoplast dispersion with the polyisocyanate polyaddition reaction and polycondensation reaction taking place simultaneously. Ratio of solid content = 1:1.

Formulation 888 parts by weight of Polyether I as dispersing agent;
2 parts by weight of 85% phosphoric acid;
1 part by weight of normal sodium hydroxide solution;
27.22 parts by weight of hydrazine monohydrate (99%);
93.76 parts by weight of diisocyanate T 80;
Reactive solution consisting of
60 parts by weight of dimethylolurea,
30 parts by weight of urea and
21 parts by weight of melamine in
118 parts by weight of water.

Conditions of preparation

The dispersing agent and freshly prepared reactive solution are mixed together in a stirrer apparatus and the mixture is rapidly heated to 80° C. Hydrazine, phosphoric acid and sodium hydroxide solution are then added and immediately thereafter the diisocyanate is introduced so rapidly that the reaction mixture boils under reflux. When all the diisocyanate has been added, the water is distilled off at reduced pressure. Towards the end of distillation, the temperature is raised to 110°–130° C. for about 15 minutes.

The finely divided 20% (10%) dispersion has a viscosity at 25° C. of 5350 cP (1780 cP).

Example 8

Preparation of a 20% PHD/aminoplast dispersion in a polyether mixture.

When the simultaneous polyaddition-polycondensation reaction described in Example 7 is carried out in a mixture of Polyether I and Polyether II (1:1), a stable dispersion which has a viscosity at 25° C. of 3900 cP (920 cP) at a concentration of 20% (10%) is obtained.

Example 9

20% PHD/polymethyleneurea dispersion in Polyether III.

Formulation 671 parts by weight of Polyether III;
3.0 parts by weight of acetic acid;
20.2 parts by weight of hydrazine monohydrate (99%);
69.6 parts by weight of diisocyanate T 80;
reactive solution of
60.0 parts by weight of urea,
11.3 parts by weight of E-caprolactam and
85.1 parts by weight of 37% aqueous formaldehyde solution in
34.0 parts by weight of water.

The method is analogous to that of Example 7.

The resulting 20% (10%) dispersion shows a slight Tyndall effect and has a viscosity at 25° C. of 5900 cP (1390 cP).

Example 10

10% Aminoplast/polyurethane elastomer dispersion in Polyether I. Ratio of solid content 9:1.

Formulation 723 parts by weight of Polyether I;
18.3 parts by weight of a 40% aqueous anionic polyurethane elastomer dispersion prepared from a butanediol/adipic acid polyester (OH number 52), diisocyanate T 80, 1,2-propylenediamine and AAS salt;
120 parts by weight of a 50% aqueous urea solution;
89.2 parts by weight of a 37% aqueous formaldehyde solution;
0.1 part by weight of 10% sulphuric acid as catalyst.

Reaction Conditions

A mixture of the polyether, aqueous polyurethane dispersion and catalyst are introduced into a stirrer apparatus equipped with distillation attachment, and the mixture is heated to 50° C. Formaldehyde solution is added with vigorous stirring, and the urea solution is subsequently added slowly. The temperature of the reaction mixture is then raised to 90° C. and distillation of water at reduced pressure is begun 30 minutes later.

The finely divided, non-sedimenting dispersion has a viscosity of 4500 cP at 25° C.

If, for comparison, the condensation reaction is carried out under the same conditions but without the aqueous polyurethane dispersion, the end product obtained is a coarse dispersion, a considerable proportion of which sediments within a short time.

Example 11

Discontinuous preparation of a 20% polyhydrazodicarbonamide/polymethyleneurea dispersion in a branched chain polyether by simultaneous polyaddition and polycondensation. Ratio PHD:PMHS=1:1.

Formulation 5710 parts by weight of Polyether I as dispersing agent,
175 parts by weight of hydrazine monohydrate (99%),
230 parts by weight of water and
603 parts by weight of diisocyanate T 80;
reactive solution consisting of
600 parts by weight of urea and
770 parts by weight of 37% aqueous formaldehyde solution.

Conditions of Preparation

The dispersing agent and the hydrazine monohydrate diluted with water are introduced into a stirrer apparatus equipped with reflux condenser. The mixture is heated to 90° C. with stirring and the diisocyanate T 80 and the reactive solution kept at a temperature of 20° C. are introduced simultaneously but separately into the liquid phase under conditions of powerful turbulence and at such a rate that the reaction mixture boils gently under reflux. The diisocyanate and the reactive solution are introduced in such proportions that the quantities added are equivalent at the beginning and at the end of addition.

The water is then distilled off under reduced pressure at 80 to 100° C.

The finely divided 20% (10%) dispersion has a viscosity of 7750 cP (2150 cP) at 25° C.

What is claimed is:

1. A process for the in situ preparation of stable dispersions of polyaddition and polycondensation products optionally containing ionic groups in compounds containing hydroxyl groups as dispersing agents comprising reacting
   (a) organic polyisocyanate with
   (b) compounds having primary and/or secondary amino groups and/or primary hydroxyl groups in
   (c) organic compounds having at least one hydroxyl group,
compounds (c) having secondary hydroxyl groups if compounds (b) have primary hydroxyl groups, the reaction being optionally carried out in the presence of more than 4% by weight of water, based on the quantity of reaction mixture including water, and optionally followed by removal of the water in known manner, characterized in that polycondensation of substances capable of aminoplast and/or phenoplast formation is carried out in the hydroxyl containing dispersing agent (c) simultaneously with the polyisocyanate polyaddition reaction.

2. A process for the preparation of stable dispersions of polyaddition and polycondensation products optionally containing ionic groups in hydroxyl containing compounds as dispersing agents comprising the in situ polycondensation of substances capable of aminoplast and/or phenoplast formation wherein the polycondensation reaction is carried out in a dispersing agent comprising an organic compound having at least one hydroxyl group which contains, dispersed therein, from 1 to 50% by weight of reaction products of
   (a) organic polyisocyanates with
   (b) higher molecular weight and/or low molecular weight compounds having primary and/or secondary amino groups and/or hydroxyl groups.

3. The process of claim 2 wherein
   (a) organic polyisocyanates are reacted with
   (b) compounds having primary and/or secondary amino groups and/or primary hydroxyl groups in
   (c) organic compounds having at least one hydroxyl group
in a first stage of the process, compounds (c) having secondary hydroxyl groups if compounds (b) have primary hydroxyl groups, the reaction being optionally carried out in the presence of more than 4% by weight of water, based on the quantity of reaction mixture including water, and optionally followed by removal of the water, and compounds capable of aminoplast and/or phenoplast formation are polycondensed in the resulting finely divided dispersion in a second stage of the process.

* * * * *